United States Patent
Penfield et al.

(10) Patent No.: US 12,248,874 B2
(45) Date of Patent: Mar. 11, 2025

(54) AUTOMATIC IDENTIFICATION OF LESSONS-LEARNED INCIDENT RECORDS

(71) Applicant: VelocityEHS Holdings, Inc., Chicago, IL (US)

(72) Inventors: Julia Penfield, Seattle, WA (US); Pulkit T. Parikh, Toronto (CA)

(73) Assignee: VELOCITYEHS HOLDINGS, INC., Chicago, IL (US)

(*) Notice: Subject to any disclaimer, the term of this patent is extended or adjusted under 35 U.S.C. 154(b) by 0 days.

(21) Appl. No.: 17/973,344

(22) Filed: Oct. 25, 2022

(65) Prior Publication Data

US 2024/0135164 A1 Apr. 25, 2024
US 2024/0232609 A9 Jul. 11, 2024

(51) Int. Cl.
G06N 3/08 (2023.01)

(52) U.S. Cl.
CPC ..................... *G06N 3/08* (2013.01)

(58) Field of Classification Search
CPC ...................................................... G06N 3/08
See application file for complete search history.

(56) References Cited

U.S. PATENT DOCUMENTS

| | | | | |
|---|---|---|---|---|
| 11,003,862 | B2 * | 5/2021 | Aggarwal | G06F 16/93 |
| 11,324,439 | B2 | 5/2022 | Diaz-Arias et al. | |
| 11,482,048 | B1 | 10/2022 | Diaz-Arias et al. | |
| 11,790,296 | B1 * | 10/2023 | Henryson | G06Q 30/016 |
| | | | | 705/7.25 |
| 2001/0043742 | A1 * | 11/2001 | Melen | G06V 30/40 |
| | | | | 382/203 |
| 2017/0147676 | A1 * | 5/2017 | Jaidka | G06F 16/35 |
| 2019/0294692 | A1 * | 9/2019 | Zhao | G06F 16/24578 |
| 2019/0294874 | A1 * | 9/2019 | Orlov | G06V 30/413 |
| 2020/0401932 | A1 * | 12/2020 | Kumar | G06F 16/953 |
| 2021/0064861 | A1 * | 3/2021 | Semenov | G06V 30/413 |
| 2022/0079510 | A1 | 3/2022 | Robillard et al. | |
| 2022/0094713 | A1 * | 3/2022 | Lee | H04L 63/1483 |
| 2022/0129621 | A1 * | 4/2022 | Guda | G06V 10/82 |
| 2022/0335073 | A1 * | 10/2022 | Semenov | G06F 16/3347 |

(Continued)

OTHER PUBLICATIONS

Winkler et al. (Optimizing for Recall in Automatic Requirements Classification: An Empirical Study, Sep. 2019, pp. 40-50) (Year: 2019).*

(Continued)

*Primary Examiner* — George Giroux
(74) *Attorney, Agent, or Firm* — K&L Gates LLP

(57) ABSTRACT

Systems and methods to classify incident report documents are disclosed, comprising inputting, a first type data entry of a document into a deep neural network (DNN); encoding, via the DNN, the first type data entry to output a densely embedded contextual vector representing contents of the first type data entry; generating, a list containing ordered data from a second type data entry of the document; encoding, via a machine learning network, the ordered data into a sparse vector representation of the second type data entry; concatenating, the densely embedded contextual vector with the sparse vector representation to generate a representative vector of the document; and training a gradient-boosted classifier network by using as training inputs the representative vector and a label associated with the document to generate a classification of the document.

22 Claims, 11 Drawing Sheets

(56) References Cited

U.S. PATENT DOCUMENTS

2022/0335340 A1* 10/2022 Moustafa ............ G06F 16/9024
2022/0386942 A1   12/2022 Diaz-Arias et al.
2023/0046344 A1*  2/2023 Grohs .................. G06F 40/216
2023/0067069 A1*  3/2023 Ghatage ................ G06F 18/217

OTHER PUBLICATIONS

Gallo et al. (Multimodal Classification Fusion in Real-World Scenarios, Nov. 2017, pp. 36-41) (Year: 2017).*
Atrey et al. (Multimodal fusion for multimedia analysis: a survey, Apr. 2010, pp. 345-379) (Year: 2010).*
Rokach (Ensemble-based classifiers, Nov. 2009, pp. 1-39) (Year: 2009).*
Robson et al. (Developing leading indicators from OHS management audit data: Determining the measurement properties of audit data from the field, Mar. 2017, pp. 93-103) (Year: 2017).*
Sarkar et al. (Prediction of Occupational Incidents Using Proactive and Reactive Data: A Data Mining Approach, Dec. 2016, pp. 65-79) (Year: 2016).*
Hurley, Niall, et al., "Comparing Measures of Sparsity," IEEE Transactions on Information Theory, vol. 55, No. 10, Oct. 2009, pp. 4723-4741.
Senel, Lutfi, et al., "Semantic Structure and Interpretability of Word Embedding," IEEE/ACM Transactions on Audio, Speech, and Language Processing, vol. 26, No. 20, Oct. 2018, pp. 1769-1779.

* cited by examiner

300 

```
┌─────────────────────────────────────────────────────────────────────────┐
│ Input, a data entry, of a first field type, of a document into a deep   │
│ neural network (DNN) 305                                                │
└─────────────────────────────────────────────────────────────────────────┘
                                    │
                                    ▼
┌─────────────────────────────────────────────────────────────────────────┐
│ Encode, via the DNN, the data entry to output a densely embedded        │
│ contextual vector representing contents of the data entry 310           │
└─────────────────────────────────────────────────────────────────────────┘
                                    │
                                    ▼
┌─────────────────────────────────────────────────────────────────────────┐
│ Encode, via a machine learning network, ordered values representing     │
│ another data entry, of a second field type, into a sparse vector        │
│ representation of the another data entry 315                            │
└─────────────────────────────────────────────────────────────────────────┘
                                    │
                                    ▼
┌─────────────────────────────────────────────────────────────────────────┐
│ Concatenate, the densely embedded contextual vector with the sparse     │
│ vector representation to generate a representative vector of the        │
│ document 320                                                            │
└─────────────────────────────────────────────────────────────────────────┘
                                    │
                                    ▼
┌─────────────────────────────────────────────────────────────────────────┐
│ Input, the representative vector and a label associated with the        │
│ document, as training inputs, into a gradient-boosted classifier        │
│ network to generate a classification of the document 325                │
└─────────────────────────────────────────────────────────────────────────┘
```

*FIG. 3*

| Category | Example 1 | Example 2 |
|---|---|---|
| Title | Partial loss of 3.3KV board in S1 substation. | Sight Glass Failure on W.N.A. 1 C12 Cooler Condenser 2 |
| IncidentType | Environmental Release, PRD Activation, Equipment Failure | Environmental Release, Process Safety Event, Equipment Failure |
| DateOfOccurrence | 10/26/2020 18:35 | 2/5/2021 7:40 |
| ShiftBegan | 10/26/2020 18:00 | 2/5/2021 7:00 |
| RelationshipsOfPersonsInvolved | Employee | Employee |
| TaskAtTimeOfIncident | Normal production | Normal running at full Rates. |
| ObjectThatDirectlyInjuredOrMadePersonIll | | |
| PhysicalOrImmediateCausesOfIncident | Motor failure on P7401H which tripped the 3.3KV supply board in substation 1 | Sight Glass Failure on W.N.A. 1 C12 Cooler Condenser 2 |
| FirstAid | n | n |
| RestrictedWork | n | n |
| LostWork | n | n |
| Fatality | n | n |
| InjuryIllnessType | | |
| BodyPart | | |
| AccidentType | | |
| AccidentAgent | | |
| PPEWorn | n | n |
| ReportableEnvironmentalRelease | y | y |
| ReportableFireExplosion | n | n |
| WeatherConditions | Clear | |
| ReportableNA | n | n |
| TypeOfEquipmentFailure | Pump | Other - Mechanical |
| Equipment | Motor failure on P7401H which tripped the 3.3KV supply board in substation 1 | Sight glass |
| Likelihood | | |
| Consequence | | |
| RiskLevel | | |
| RootCauseLevel2 | | |
| ChemicalClass | Toxic | Toxic; Corrosive |
| ReleaseSource | Flare/Relief System | Sight glass; Sight glass |
| ReleaseTo | Air | Air; Air; Secondary Containment |
| QuantityReleased | 253 kg | 18 kg; 228 kg |
| QuantityRecovered | 0 kg | 0 kg; 0 kg |
| OnsiteAreaAffected | 0 m^2 | 0 m^2 |
| OffsiteAreaAffected | 0 m^2 | 0 m^2 |
| TimeToContain | 16 min | 2 min; 30 min |

AUTOMATIC IDENTIFICATION OF LESSONS-LEARNED INCIDENT RECORDS

TECHNICAL FIELD

Disclosed are systems and methods related to generating and training machine learning models and architectures specific to the field of document classification, prediction, and identification to be used to automate document management. In particular, this application is directed to automatic identification of lessons-learned incident records.

SUMMARY

In various aspects, the present disclosure provides a computer implemented method of training a machine learning network to classify a document, the method comprising inputting, a data entry, of a first field type, of a document into a deep neural network (DNN); encoding, via the DNN, the data entry to output a densely embedded contextual vector representing contents of the data entry; encoding, via a machine learning network, ordered values representing another data entry, of a second field type, into a sparse vector representation of the another data entry; concatenating, the densely embedded contextual vector with the sparse vector representation to generate a representative vector of the document; and inputting, the representative vector, as training inputs, into a gradient-boosted classifier network to generate a classification of the document.

In various aspects, the present disclosure presents a system to automatically classify and transfer files, the system comprising at least one of a database or server containing a plurality of data documents, wherein the plurality of data documents are stored in at least one location via a file system; a processor; and a computer readable medium storing instructions executable by the processor, to input a representative vector of the document into a trained classifier network; determine a classification of the document by the trained classifier network based at least on the representative vector; based on the classification determine an appropriate file location of the document; and transfer the document to the appropriate file location.

In various aspects, the present disclosure provides a non-transitory computer-readable storage medium having embodied thereon a program, the program being executable by a processor to perform a method for providing a sentiment for digital information comprising
inputting, one or more data entries, of one or more field types, from a document into a deep neural network (DNN); encoding, via the DNN, the one or more data entries to output a densely embedded contextual vector representing contents of the one or more data entries; encoding, via a machine learning network, ordered values representing another one or more data entries, of one or more other field types, into a sparse vector representation of the another data entry; concatenating, the densely embedded contextual vector with the sparse vector representation to generate a representative vector of the document; and inputting the representative vector and a label associated with the document, as training inputs, into a classifier network to generate a classification of the document.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
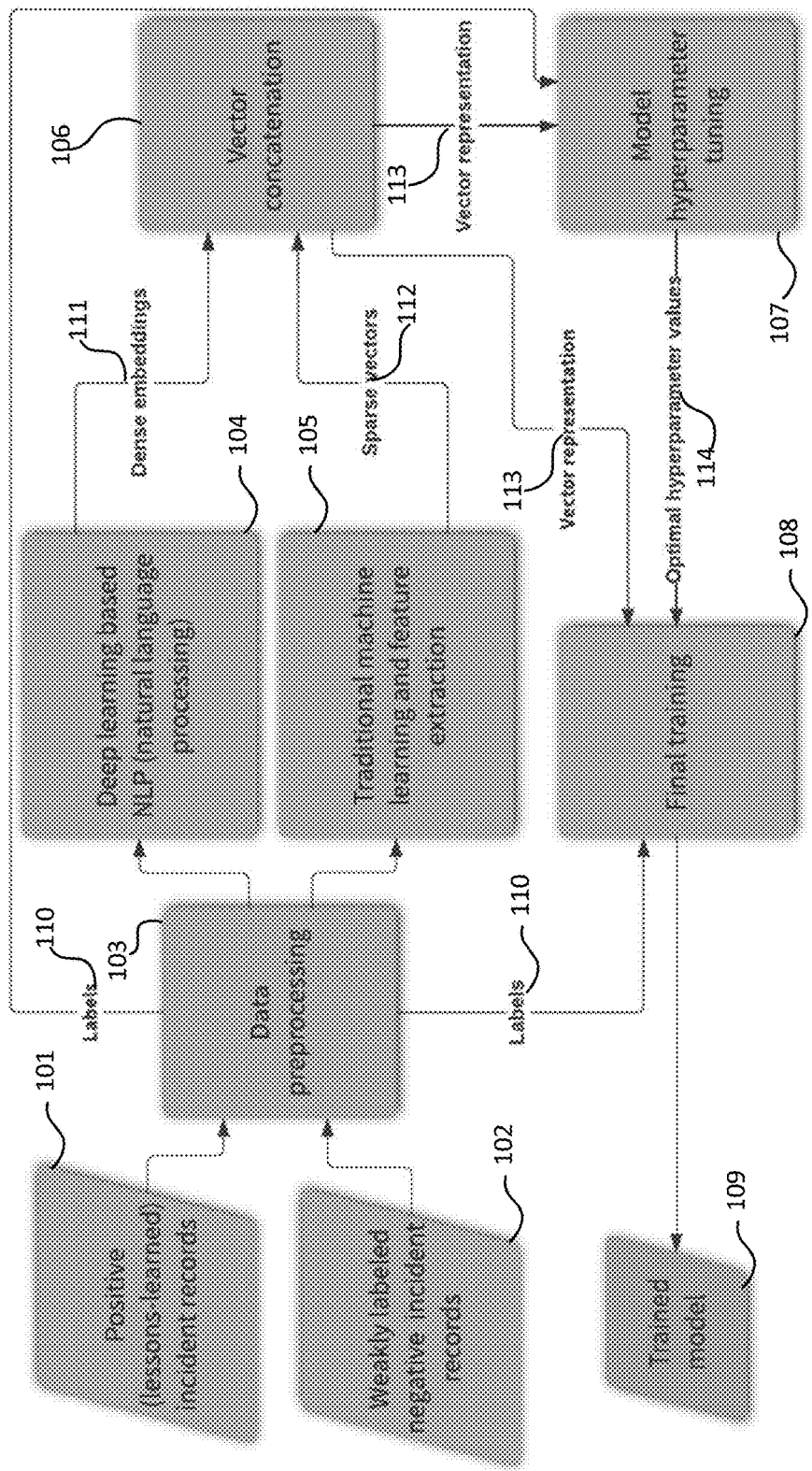

The systems, and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a flow chart of one aspect of a method to train a classifier model to automatically identify lessons learned records, according to at least one aspect of the present disclosure.

Figure 2:
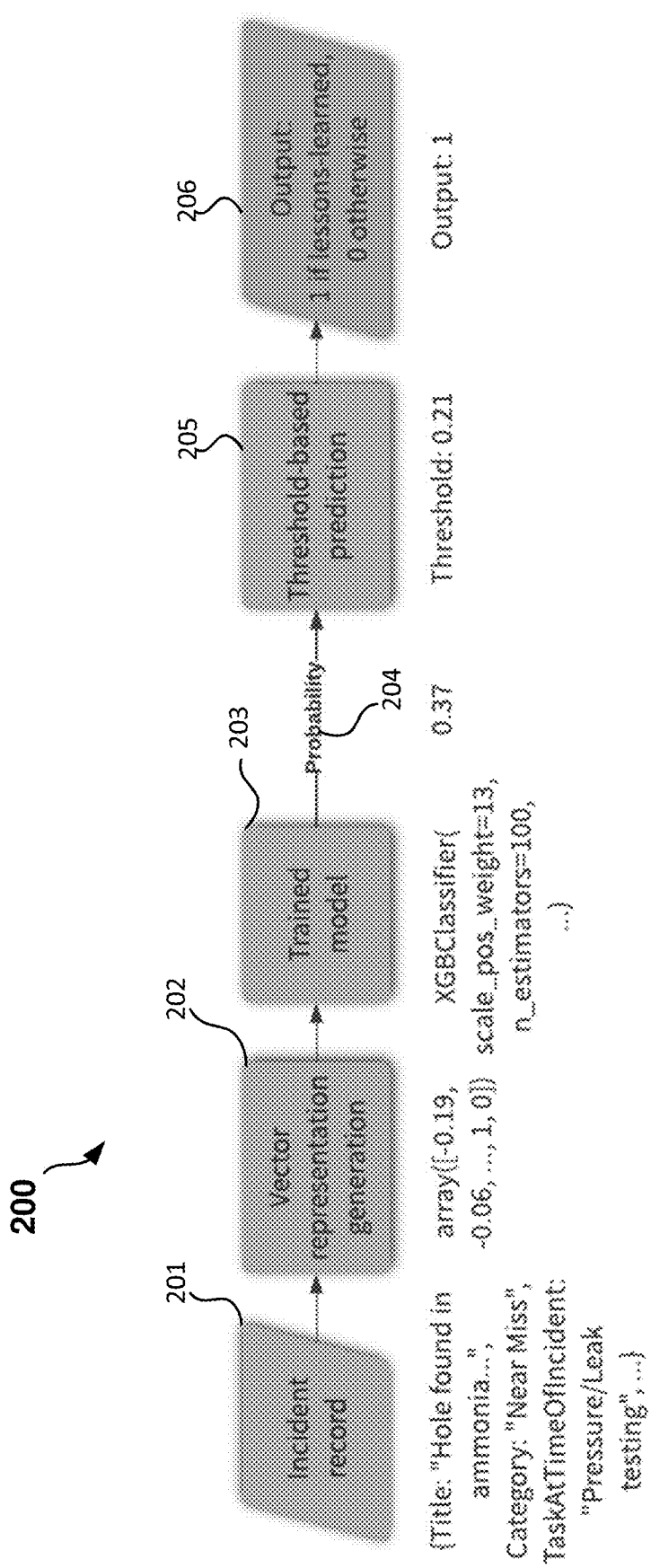

FIG. 2 illustrates a flow chart of one aspect of a method to automatically identify lessons learned records via a trained classifier, according to at least one aspect of the present disclosure.

FIG. 3 illustrates a flow chart of one aspect of a method to train multiple types of machine learning networks within an architecture to automatically classify a document, according to at least one aspect of the present disclosure.

Figure 4:
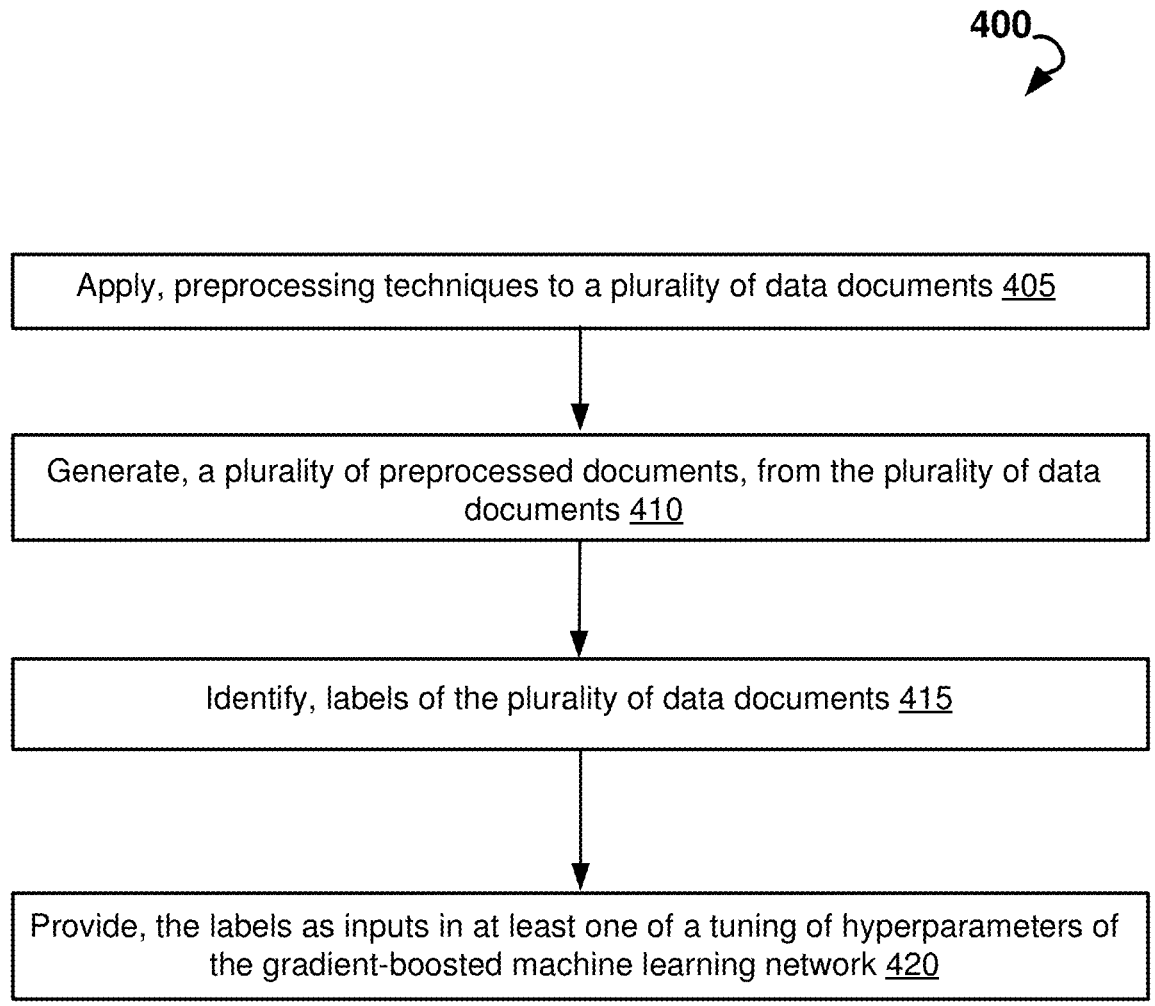

FIG. 4 illustrates a flow chart of one aspect of applying preprocessing techniques to data to be used as inputs in the systems and methods disclosed herein, according to at least one aspect of the present disclosure.

Figure 5:
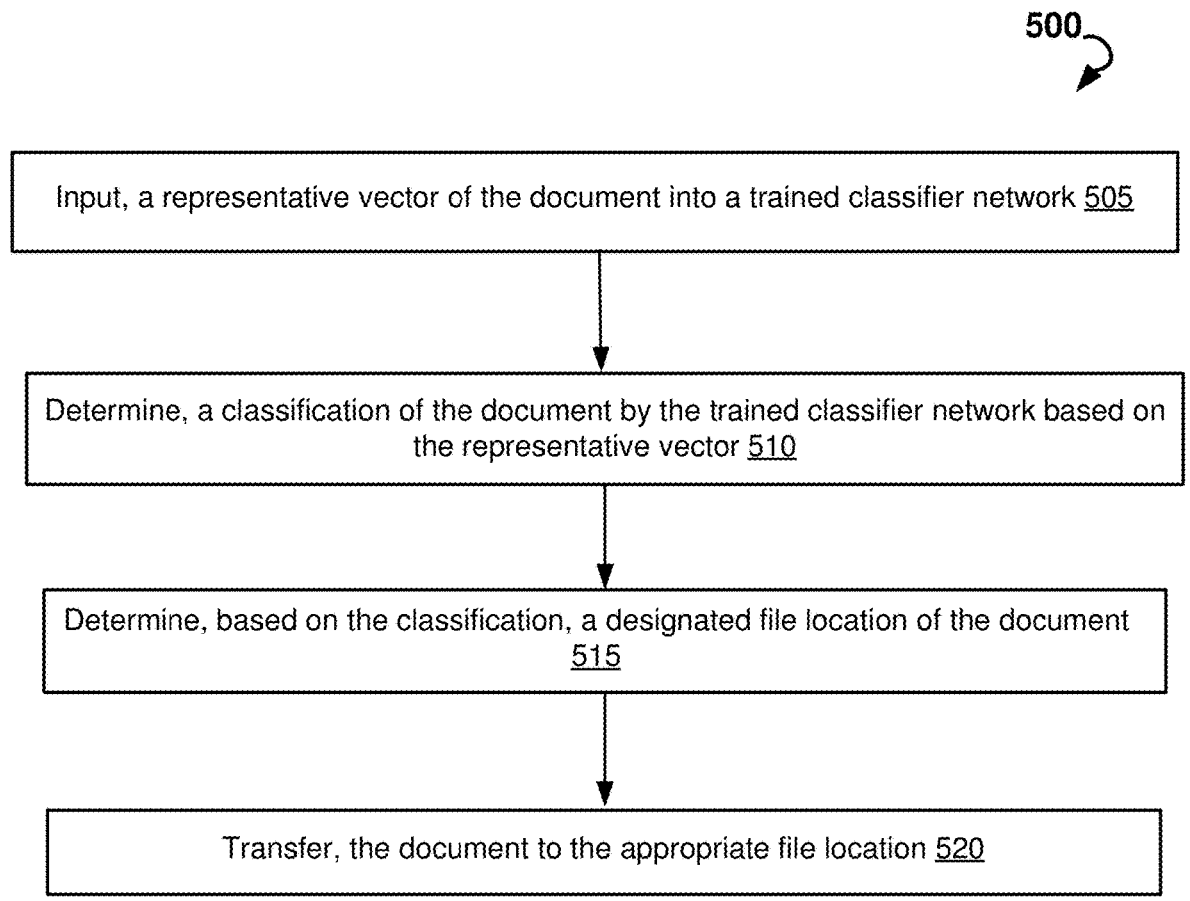

FIG. 5 illustrates a flow chart of one aspect of systems and methods to automatically move files and documents from one location to another based on the application of automated classification systems and methods disclosed herein, according to one aspect of the present disclosure.

FIG. 6 illustrates a dataset of incident reports that may be used in the systems and methods disclosed herein.

Figure 7:
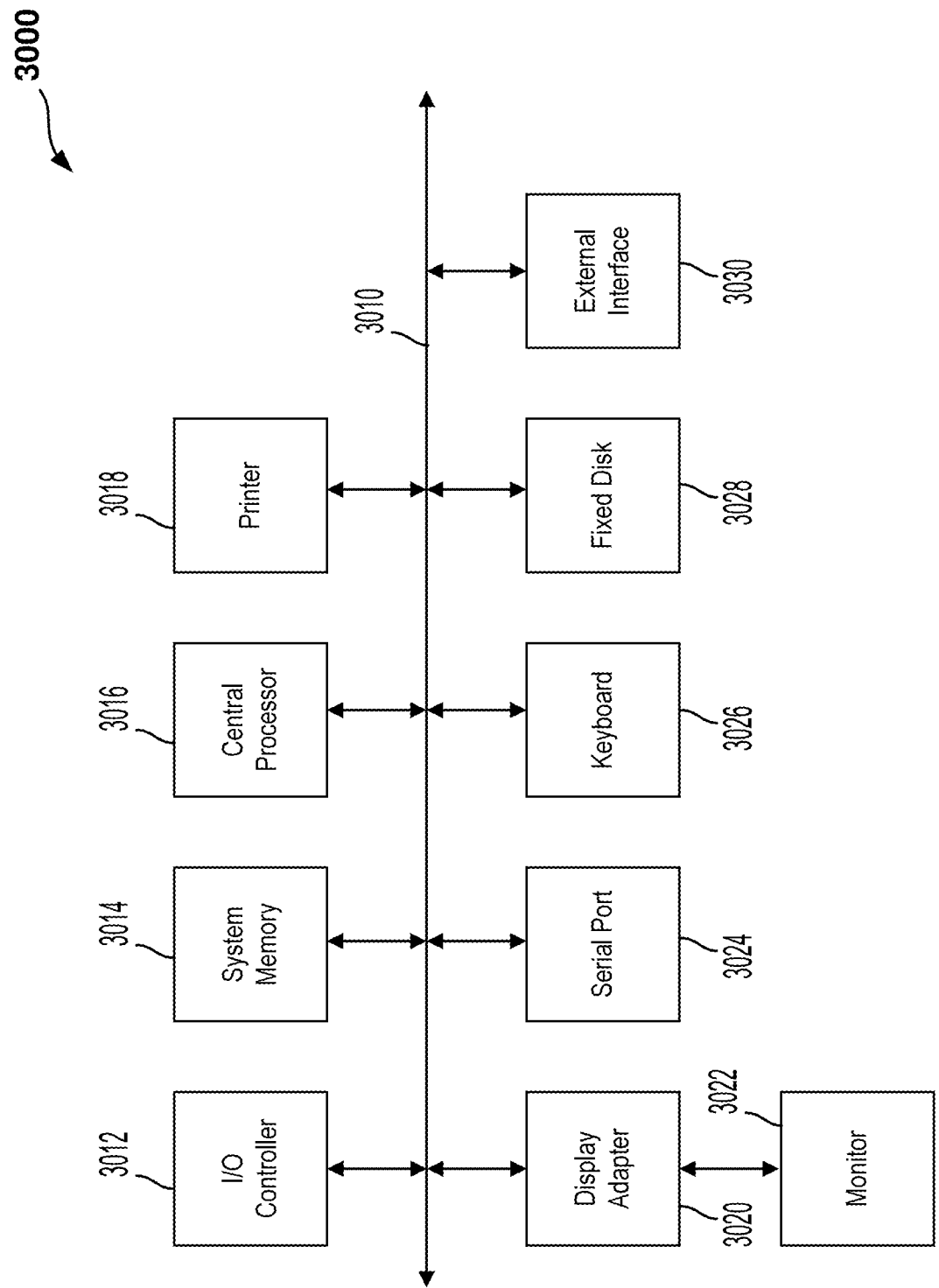

FIG. 7 presents a block diagram of a computer apparatus, according to at least aspect of the present disclosure.

Figure 8:
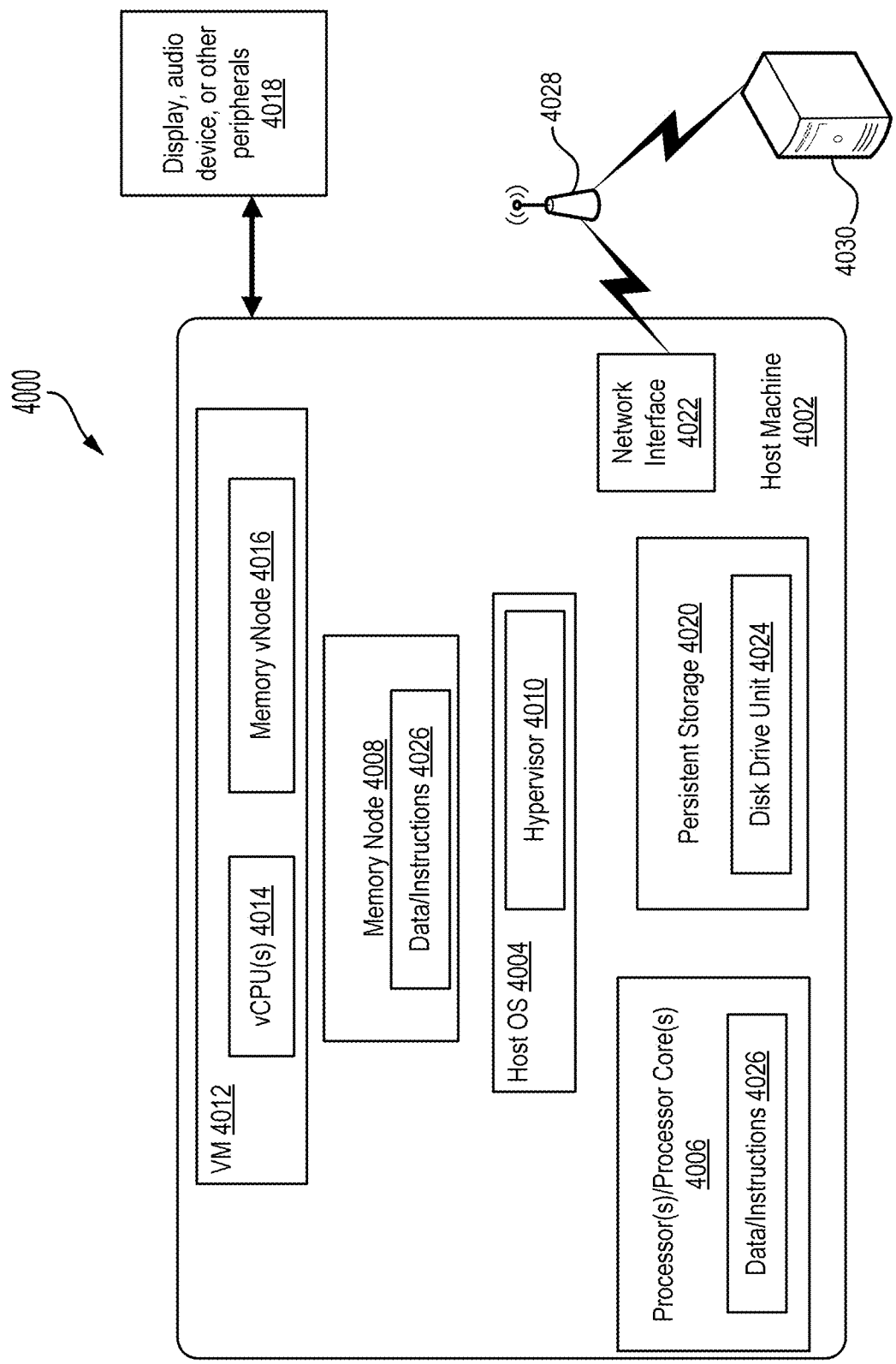

FIG. 8 is a diagrammatic representation of an example system that includes a host machine within which a set of instructions to perform any one or more of the methodologies discussed herein may be executed.

Figure 9A:
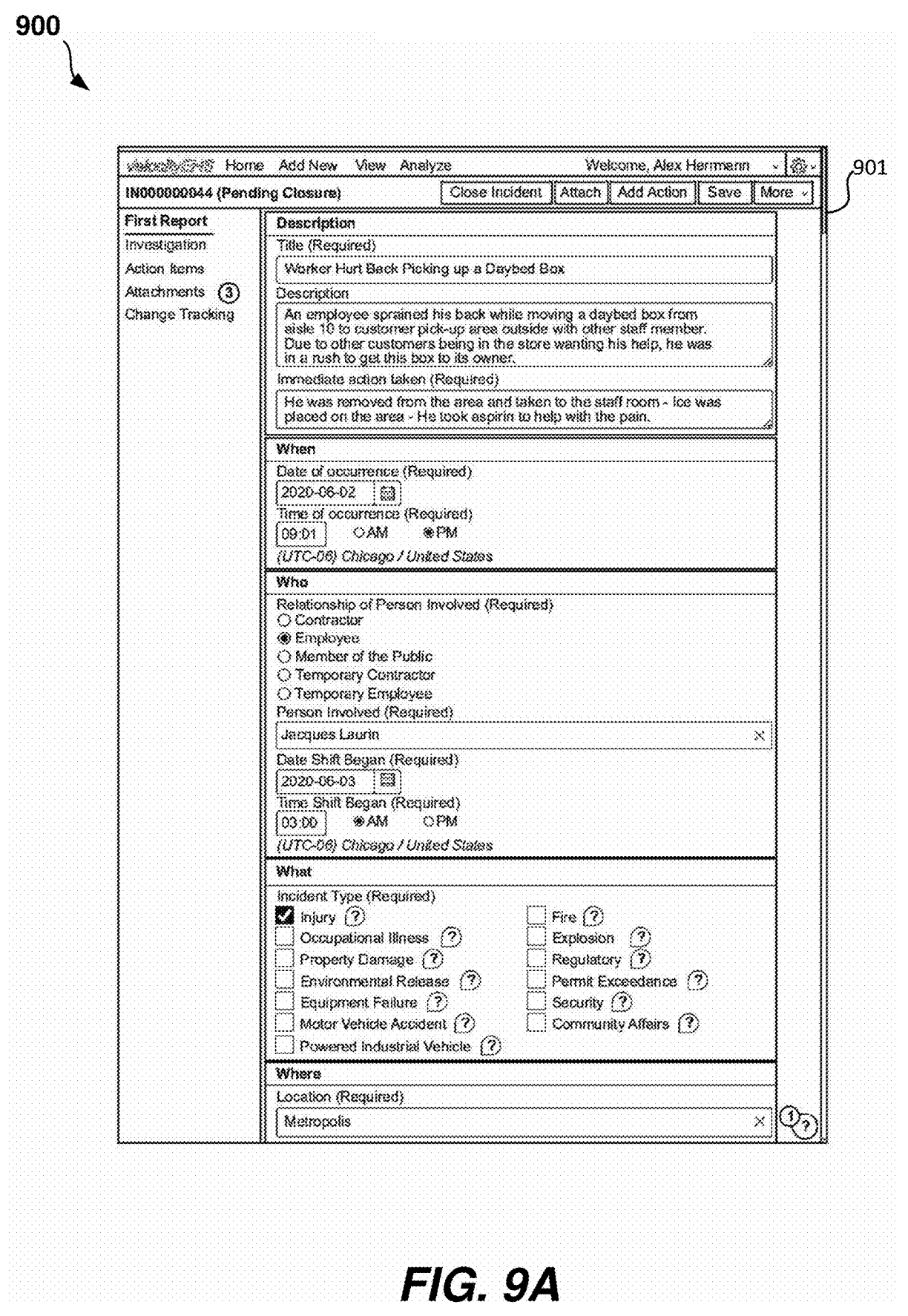
Figure 9B:
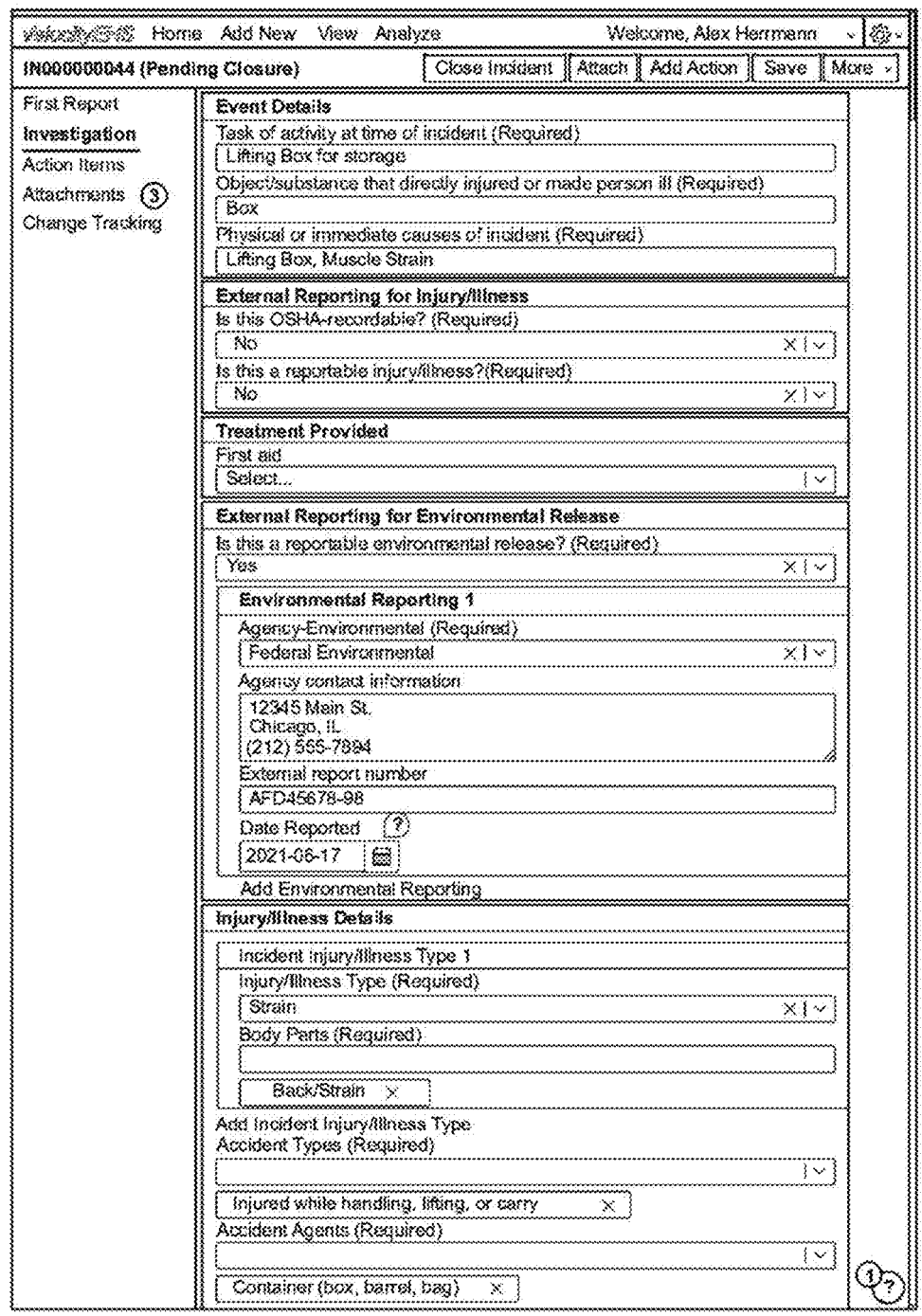
Figure 9C:
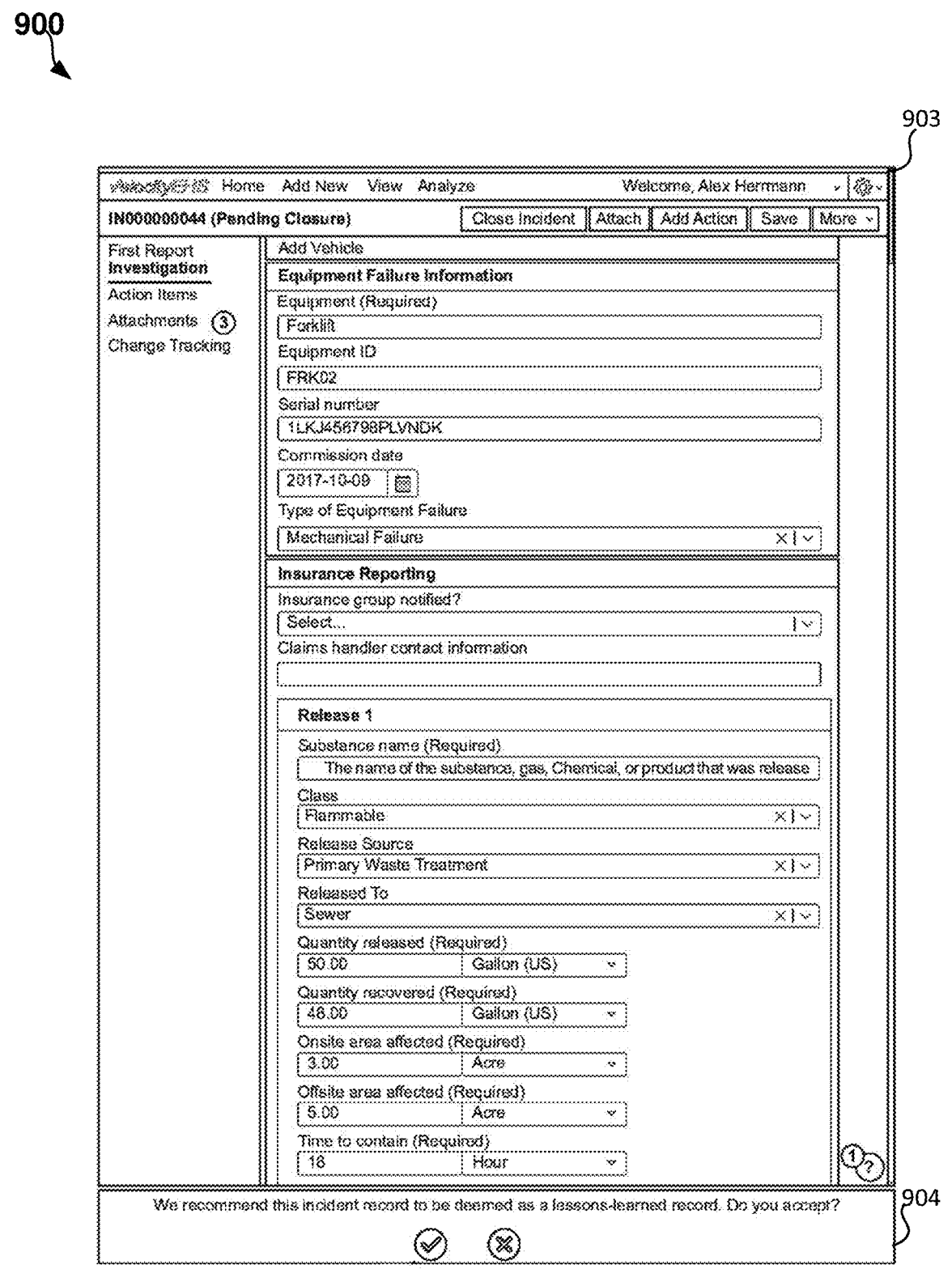

FIG. 9A-9C illustrates multiple screens of one aspect of a user interface that may be utilized or displayed by any of the systems and methods described herein.

DESCRIPTION

Before discussing specific embodiments, aspects, or examples, some descriptions of terms used herein are provided below.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible.

Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "system" may refer to one or more computing devices or combinations of computing devices (e.g., processors, servers, client devices, software applications, components of such, and/or the like).

There exists a substantial, growing amount of data regarding incidents at industrial and workplace sites that give rise to injuries to the workers and/or property damage. Various documents and files, including in electronic or digital formats, may be used to record or report workplace injuries, accidents, and damage to property. These documents may include incident-describing records that can be utilized to provide actionable lessons or important lessons learned that are valuable for incorporation into existing workplace structures, health and safety policies, systems, or for wide dissemination or communication within an organization to reduce the risk of future incidents. These valuable documents containing lessons that may be used for future learnings and improvements to organizational policies to reduce accidents and damage from accidents may be referred to herein as "lessons-learned records" or "lessons-learned reports". Broader documents containing reports of information about incidents, but that which may or may not contain valuable information as lessons-learned records may be identified herein as "incident records".

The identification and classification of one set of documents, that may be specific to a narrower need or be part of a narrower grouping than other documents, for example, determining which records are lessons-learned records or reports from incident records, and which are other documents or mere basic incident reports requires not only an expert to go through the reports and identify or classify them correctly, but also relies generally on additional staff to reorganize and transfer the records from one location to another.

Given the considerable, rising volume of incident records, and overall document generation by businesses, government agencies, and other workplaces, manually identifying, classifying, and utilizing important documents out of broader documents that are generated and maintained in an organization, for example lessons-learned records from incident records, is generally impracticable and prohibitively expensive. Furthermore, the storage, transfer, labelling, and management of specific types of records from other or broader types or groupings of records, is also labor intensive and therefore not carried out at all, or if it is undertaken it is done so manually by individual employees who must spend hours navigating file storage systems. A database or filesystem, may be virtual, physical, or a cloud storage based solution, and may utilize file management systems to organize files within an organization. However, accurate record keeping practices rely on manual human interaction for the transferring, updating, or managing records from one location to another in a file system, a file management system, or from one location to another location in a database, or the communication of such records to an organization.

Various technical problems arise when training machine learning models to identify or classify one group of documents from another group of documents. One major issue is the small amount of positively labeled data (also referred to as "positive data") that is available to train the model(s), for example incident records that have been labeled as lessons-learned records by staff or other human users. Extreme imbalances between positive and negative data make it difficult to train machine learning models to deliver accurate classification or identification results.

Another issue is the sheer amount of data. Raw (unprocessed or unfiltered) data may consist of millions of entries organized in fields, rows, or columns for example, with each entry capturing information about an incident. A document or incident record may comprise multiple fields, with each field comprising one or more values, where the values in the field are the data entry. These values may be alphanumeric, binary, or any other type of entry depending on an embodiment. An example of a field may be the field "injury type", and a data entry, or entered value of the field may be "fracture" or "broken arm". Fields may be structured and limited in the length or number of values they contain, or the type of values they may contain, for example a field that contains only numbers, or a field that only contains values that may equal "y" to denote yes, and "n" to denote no. Other fields may for example contain unstructured, free-flowing text. These fields may be in rows and/or columns and may be referred to herein as a "field", and its plural forms. A "field entry" and its plural forms refer to the value entered in a field, and may be referred to as a "value" and its plural forms. A "data entry" may comprise a field with its accompanying value or field entry.

Another issue with data that is used as inputs in classifiers and models that identify documents is the quality of available data. The quality of the data poses problems for training machine learning models, because data or documents may include missing values such as unpopulated cells in fields, rows, or columns. In addition to missing values, documents may contain unhelpful or false information further distorts the inputs and training data. Documents may also contain structures, data types, or fields that do not fit the criteria of a document. In non-idealized and real-world application of available data, in the field of document classification, the majority of input data can include missing values.

Other technical issues are also abound in the field of automated document management, identification, modification, and classification, especially when training or designing classifiers and machine learning models for specific tasks. At a surface level, these issues may concern the various types of available models, that are deployable at each stage of the process, the various possible architectures of each model, the data and data types utilized to train each model, the varied and large number ways inputs may be combined or utilized by various methods, and the tuning of parameters and hyperparameters. The combination of even some of these issues pose an infinite amount of problems that must be designed for or overcome to produce models of document classification and identification that are sufficiently accurate, yet reliable to be deployable into infrastructure systems of businesses and other agencies. These examples are not exhaustive of the countless unknown issues that may also appear during the design, training and operation of classifier networks.

One practical application of the technologies disclosed herein, is a system and architecture of machine learning networks combined with various computer-based techniques capable of identifying specific types of documents from other documents, including and not limited to the identification of lessons-learned records from incident reports or records. For example, disclosed is a computing-based architecture of a model for training and utilizing a classifier that is able to identify and classify specific types of documents from more general documents.

Another practical application is the automatic transfer, movement, or copying of documents from one or more locations, to other one or more locations, based on their determined classification, as well as the automatic removal, modification, renaming, and mass dissemination or communication of files or folders based on the classification of documents within folders, or organizations. These practical applications of the technologies presented may rely on methods of training various machine learning networks or models to be able to effectively determine or classify documents from other documents in connected document databases and file management applications. In one aspect for example, a supervised machine learning model is utilized to be able to automatically identify the lessons-learned records from a given set of incident records stored in a database, and reclassify these records, transfer them, rename them, or move them in memory from one location to another.

FIG. 1 illustrates a flow chart of one aspect of a method 100 to train a classifier model to automatically identify lessons learned records from multiple incident records, according to at least one aspect of the present disclosure. Method 100 includes utilizing positive data 101 that are labeled as a specific type of document such as already labeled as 'lessons-learned records'. The method 100 also utilizes negative data 102 which are weakly labeled or non-labeled broader document records, for example, documents recognized as incident records. The positive data 101 and negative data 102 are all pre-processed 103 to allow them to be used as inputs in the training of the systems and networks being trained to recognize or classify the documents. The preprocessing 103 generates labeled data 110 (also referred to herein as "label" and its plural forms) where the labels 110 as associated with specific documents that are preprocessed 103.

The preprocessing 103 of data may include filtering any of rows, columns, and/or fields, and may cause the identification, classification, or creation of distinct types or categories of fields in each document, these fields or field entries may be in rows of columns, depending on the specific embodiment. A "vocabulary" as discussed herein refers to the unique words present in a field. These fields are classified into a set number of field types or field categories that are either pre-identified, preset, and/or identified based on and during the preprocessing of the data. Reports or records are first filtered based on their temporal distribution. Fields in the reports or records are then filtered based on missing value ratios and their relevance. A first type of field is the "free-text" field containing unstructured text with a reasonably large vocabulary. An example of this type of field is a "Title" field which may contain the name of the report or a small summary, for example, "Resin spilled in QC office on floor and work bench. No release of chemicals to the environment".

Another type of identifiable field is the "categorical" field which is a field with a small number of unique textual values. The categorical field may be for example a "consequences" field that categorizes the consequences of an accident with field entries or values "low", "moderate", and "high". A third field type that may be identified by the preprocessing 103 is a "small-vocab" field which is a textual column but one that has too many entries or unique values such as words or phrases to fall within a "categorical" type field, but has a vocabulary (unique words) that is too small to be classified as a "free-text" field. An example would be a field titled "TypeOfEquipmentFailure" which may read "Mechanical failure—gas coolers". A fourth category or type of field is a "Quantity-based" field that typically contains numeric and textual information describing or capturing area, volume, or time information, generally with the textual entry in this field being limited to describing a unit of measurement. An example of a "Quantity-based" field is a field entry in a document "OnsiteAreaAffected" with a value of "16 sq ft". A fifth category of field is a "Date and time" field that contains date and time information, an example would include a "Date" field with a value of "2018-06-29 22:00:00". Other field types or categories are also possible, which have different criteria or parameters, and may be added to the categories disclosed herein, or even replace these, depending on the embodiment.

One or more fields and their accompanying field entries identified by the preprocessing 103 of data in each document are then used as inputs to a Deep Learning Network 104 (also referred to herein as "DNN"), in various embodiments the DNN is an NLP based network. One or more other fields of the preprocessed data of each document are used as inputs into a machine learning model 105 (also referred to as "ML" 105). DNN 104 and ML 105 may be collectively referred to herein as "vector representation generators". Specific fields from each preprocessed document may be fed into each network 104, 105. The DNN outputs dense embedding 111 vectors that are representations of the field(s) and respective field entries from the document(s) fed into the DNN 104. In most embodiments the identified type of each field, or field type, determines whether the field is input into DNN 104 or input into ML 105. In most embodiments, the free-text fields that are most complex in terms of language processing are input into DNN 104, which utilizes natural language processing ("NLP") techniques based on DNN networks to encode the free-text field entries into dense embedding output vectors.

In several embodiments all non-free-text fields are input into the ML 105 and vector representations are produced for field and its respective field entry. In various embodiments ML 105 is applied differently to each type of field. Vector representations of categorical fields may be created by using one-hot embedding. While term or word frequency based vector representations are used to create vector representations for small-vocab fields when terms or words that are below a pre-determined or specific frequency, for example a frequency of 5, are ignored or discarded. This frequency could be based on a number throughout a document, or throughout a field, or throughout one or more types of fields, and/or across several documents, depending on the embodiment.

In various embodiments, Quantity-based fields are also input into the ML 105 but are first further processed. Any quantity-based fields that describe for example area, volume, or time information, are processed by first running algorithms or scripts that separate the numerical portion of the field value (that is generally associated with a quantity) from the text version, which is generally associated with the unit information. Then any non-alphanumeric characters are removed from the field, and the remaining values are input through the ML 105 to be encoded for example by using one-hot embedding or encoding. Any terms or words in the value of the field entry that do not meet a specified frequency are discarded, this frequency could be based on document-wide frequency, or based on the frequency in the field itself, or in some embodiments across various fields, or across various documents and/or fields.

Once vector representations are produced for the various fields in a document via either DNN 104 and/or ML 105 then these vectors are concatenated 106 to each other to produce a document vector representation 113. The vector representation 113 of the document as well as labels 110 derived from the data preprocessing are used in an automatic Bayesian optimization to tune 107 the hyperparameters of a deployed classifier model, to produce the best hyperparameter estimates or optimal hyperparameter values 114 for training the final classifier to classify lessons-learned records from incident reports. One classification model, for example, that could be deployed as the classifier is XGboost. In various aspects maximizing the number of recalls or classifications of positive records, i.e., maximizing the number of incident records or documents classified as lessons-learned records is preferred, and various metrics, such as the metric F3, may be optimized or focused on. Optimization may include maximizing a metric to an optimal value that produces the most positive record identifications with the least loss of accuracy.

Using the optimized optimal hyperparameter values 114, a final training 108 is conducted on the deployed classifier to produce a final training model 109. The final training 108 may include the use of labels 110 alongside the vector representations 113 of the documents, wherein the labels denote whether a record should be labeled as positive or negative. The balance or number of positive data or positive documents to the number of negative data that the final training 108 is exposed to is generally balanced to increase the relative number of positive data to the negative data, to ensure that training is not skewed towards one type of classification or another.

FIG. 2 illustrates a flow chart of one aspect of a method 200 to automatically identify lessons-learned records via a trained classifier, according to at least one aspect of the present disclosure. Once a classifier or model 203 is trained, for example in the manner described in FIG. 1, then incident records and documents may be fed into it to be classified. In one embodiment an incident record 201 is input into the architectures described in FIG. 1, for example, the incident record, being preprocessed, and having its various fields identified, has its fields used as inputs in vector representation generators 202 (for example, DNN 104 and ML 105, FIG. 1) to generate vectors that represent the fields and values of a document, and the vectors are fed into the classifier trained model 203 which determines a probability 204 of whether the vector representation is of a lessons-learned record or not, and if the probability meets a threshold 205, the trained model 203 is able to determine and output a classification 206, for example '1' if the document is a lessons-learned record or a '0' if it is not.

FIG. 3 illustrates a flow chart of one aspect of a method 300 to train multiple types of machine learning networks within an architecture to automatically classify a document, according to at least one aspect of the present disclosure. In various embodiments the method 300 commences with inputting 305, a data entry, of a first field type, of a document into a deep neural network (DNN), for example DNN 104, FIG. 1. The data entry, may comprise a field with an accompanying value. The first field type may in various embodiments be of any type including a free-text type, a categorical type, a small-vocab type, a quantity-based type, and a date-time type. And in other embodiments the first field type may be limited to a free-text type only.

The method 300 may continue with encoding 310, via the DNN, the data entry to output a densely embedded contextual vector representing contents of the data entry. The encoding may comprise various layers. In one aspect, the encoding via the DNN may first comprise a distributional word embedding technique, which averages fixed word embedding, and in other embodiments a transformer-based approach is used to undertake the encoding by the DNN. The embedding, in many embodiments produces one or more densely embedded contextual vectors that are positionally embedded according to the structure of the respective original data entry, or the structure of the values in the data entry, for example positionally embedded according to the order of values or words in the data entry.

A transformer-based encoding approach may comprise a network with an embedding layer that embeds values in the data entry, for example words or phrases, in a 1-to-1 ratio to a numerical vector, where the numerical vector depends on from the value, e.g., the word, it was embedded from. Then one or more other transformer encoder layers may transform the numerical vectors into a sequence of vectors, the encoder-produced sequence vectors being a function of the whole data entry, for example dependent on all the values contained in the field, or in other embodiments, even dependent on the field, or field type as well as the values contained in the field. Therefore the encoder produced sequence values would generally alter depending on a change in any of the values in the data entry. The encoder produced sequence values may include a CLS token, that is used by a classifier or otherwise, to determine the final output or final encoding produced by the DNN. Examples of transformer-based networks that may be utilized for this encoding include BERT, and DistilBERT. In most embodiments the data entries all come from the same document, while in other embodiments, data entries may be encoded with other data entries coming from different documents.

After, or in parallel to the encoding 310 of the data entry by the DNN, method 300 may include encoding 315 via a machine learning network, for example ML 105, FIG. 1, ordered values representing another data entry, of a second field type, into a sparse vector representation of the another data entry. In several embodiments this encoding is carried out by utilizing a one-hot embedding technique. In various embodiments the values are ordered in a separate step where a list is generated containing all the values in a data entry placed in a specified order, in preferred embodiments, in an order based on the values in the another data entry. The ordered data in the list may also be arranged in an array stored in a memory. In several embodiments, there may be multiple other data entries that could be of the same or different field types that are also encoded by the machine learning network into a sparse vector representation.

According to numerous embodiments the data entries that are encoded in step 315 are those of the categorical type, a small-vocab type, a quantity-based type, and a date-time type. While in other embodiments data entries of a free-text type may also be included. However in most embodiments the free-text type data entries are encoded in earlier step 310 by the DNN. In most embodiments the data entries all come from the same document, while in other embodiments, data entries may be encoded with other data entries coming from different documents. In numerous aspects if a value, e.g., a term, word does not meet a certain threshold or frequency, then it may be replaced by a placeholder, or completely deleted or discarded before or after encoding.

Method 300 may continue by combining or concatenating 320, the densely embedded contextual vector with the sparse vector representation to generate a representative vector of the document, i.e., concatenating 320 the vectors produced in steps 310 and 315 to produce the representative vector of the document. This representative vector may then be input 325 with or without an associated label, depending on the availability of a label associated with the document, as training inputs, into a gradient-boosted classifier network to generate a classification of the document. In numerous embodiments, the representative vector may also optionally be used for, or as inputs for determining tuning, a hyperparameter of the gradient-boosted machine learning network via automatic Bayesian optimization, where the automatic Bayesian optimization is based on the representative vector. In several embodiments, the final classifier may utilize an XGboost network or algorithm, which relies on a regularizing gradient boosting framework to produce the final output or classification of a document.

FIG. 4 illustrates a flow chart of one aspect of applying preprocessing techniques 400 to data to be used as inputs, in the systems and methods disclosed herein, according to at least one aspect of the present disclosure. Any one or more steps of the techniques described in FIG. 4 may be combined with any step or a combination of any steps from FIGS. 1-3 and 5 to provide preprocessed data for the disclosed systems and methods. In one embodiment, method 400 may apply 405 preprocessing techniques to a plurality of data documents, wherein the plurality of data documents may be labeled or unlabeled. The preprocessing techniques may identify 415 associated labels to at least a portion of the plurality of data documents.

In one embodiment, data is preprocessed 405 by filtering out rows (based on the incidents' temporal distribution) and filtering columns, before carrying out classification and clustering of the data. In most embodiments, the produced filtered data is classified into five field types (these in some aspects may also be column types if fields are set out in columns in a dataset). The preprocessing step may comprise a filtering step that filters out incidents, which may be represented by rows or columns, or by files or documents of a plurality of incident documents, where each document represents a recorded incident. This filtering of incident reports may be based on the temporal distribution of the incidents. Temporal distribution serves as a proxy metric for expected data quality as more recent data is usually more reliable than older data. For example, records based on the year of the incident may be dropped, if it is an older incident.

Owing to the fact that positive data is much less readily available, and more difficult to obtain, different filtering parameters (e.g., year of incident occurrence thresholds) for positive and negative records may be applied, such that positive records (e.g., those affirmatively labeled as lesson-learned records, or records of the specific type that the classifier is being trained to identify) are dropped or discarded very conservatively, while negative data or unlabeled incidents are discarded more readily.

Moreover, the preprocessing techniques may apply different types of filtering between different types of negative records or between different types of positive records. For example, negative records or data may be split into different non-overlapping groups, such that one group contains the records, wherein the values for all important fields or field types, or for example, columns are missing. This group is then much more liberally discarded from the dataset than a group of negative records that contain values in fields or field types deemed important.

Once filtering is undertaken by document or incident report (or data rows or columns in some embodiments), then filtering may then continue but based on the desired fields, or field types. Firstly, fields, or field types, that are irrelevant to the type of classification or clustering tasks the classifier is being trained to undertake are identified and discarded from the data set or the available incident records. For example, the fields of 'client names', 'incident numbers', and 'client codes' may all be discarded since they do not provide any information that may be used by a classifier attempting to classify the importance of a workplace injury, since these fields represent identifiers of arbitrary names. Additionally, fields may be filtered on the basis of low coverage, which is equivalent to a high rate of missing values. In one aspect, for example, a field may be removed if two conditions are met: A) it is less than 20% populated overall (among the dataset) and B) it is less than 5% populated among the positive records. Other combinations and thresholds of missing values are also possible, and these figures are presented as examples and are not exhaustive.

By applying these preprocessing techniques, method 400 may generate 410 a plurality of preprocessed documents, from the plurality of data documents, wherein each document of the plurality of preprocessed documents comprises one or more data entries, each entry of at least one type. In several embodiments, labels may be generated by the preprocessing techniques or identified 415, if documents are already labelled or contain labels. The field type may include any of the field types already described herein or any other field types that are pre-defined or discovered or determined by the preprocessing techniques applied. Finally the labels may optionally be provided 420 as part of either optimizing the hyperparameters of the final trained classifier, for example as in tuning 107 step, FIG. 1, and/or provided 420 as part the final training 108, FIG. 1, of the classifier for example, trained model 109, FIG. 1.

FIG. 5 illustrates a flow chart of one aspect of systems and methods to automatically move files and documents from one location to another based on the application of automated classification systems and methods disclosed herein, according to one aspect of the present disclosure. Any one or more steps of the techniques described in FIG. 5 may be combined with any or a combination of the steps from FIG. 1-4 to manage, move or otherwise cause actions to occur on documents classified by the systems and methods disclosed in this document. In one embodiment, method 500 may commence by inputting 505 a representative vector of a document or file, for example an incident report, into a trained classifier model, for example trained model 203, FIG. 2. In addition, and optionally, where a label associated with a document or file to be classified is available, it is also input 510 into the trained model. In various embodiments the trained model, may be a gradient boosted classifier network.

The classifier network may in various aspects determine 510 a classification of a document, this classifies the document into a type of document, and produces an output or a classification/prediction of a document, for example output 206, FIG. 2. Based on this output or classification, the system may determine 515 the appropriate file location of the document in the file system. The location may be a folder designated for documents that are classified according to the classification produced in step 510 and may be a virtual, cloud-based, or physical location, on a central or distributed file system, or file management system. Automatically, and responsive to the determined location in step 515, the system may then transfer 520 the document to the appropriate file location, for example, by moving or copying it, or causing it to move by providing instructions for transfer of the file into the designated location. This allows files or documents to be run through a classifier and then automatically moved into designated locations based on the determined file type or document classification in a file system.

In several embodiments the classification of the document may also, in a rule-based system, allow the manipulation of the document, for example by making specific modifications or alterations to documents of specific classifications, for example by providing them with a name associated with the classification. For example, reports that are not relevant to a marketing team in the firm may have its name automatically modified to include the term "MKT". In other embodiments, documents that meet other classifications may be communicated to employees or members of an organization in specific ways. For example, if a document is classified as relevant to workplace safety of a specific team, then the document may be moved to a safety best practices folder or designated location of that team and/or it may be communicated to the team by being emailed to members of the team to provide them with the lessons-learned directly. In large servers, and cloud based management systems where tags are readily used, classification of a document into a specific classification may cause labels or tags to be added to it automatically. Rules in the system may therefore be defined to use the classification in a variety of applications that allow a server, system, or IT infrastructure to automatically manage and cause actions to be taken based on the classification output of the trained classifier model.

FIG. 6 presents one example of a dataset 600 containing two example documents or incident reports. In this dataset each column is one document, i.e., the column 'Example 1' 601 is a document or an incident report, while the column 'Example 2' 602 is a document or another incident report. In the presented embodiments each document contains the same number of fields, however in various embodiments the different documents 601, 602 may have highly varied fields and field types. In this dataset 600, a column 603 which contains the field names for all the fields (or each rows as shown herein) in document 601 and document 602. Each row in the dataset is a field. One field is the 'Title' field 604, which has its values contained in field entry 605 for document 601 and field entry 606 for document 602. The field 604 is a "free-text" field as can be seen by its values 605 and 606 that contain containing unstructured text with a reasonably large vocabulary.

An example of a "Date and time" field that contains date and time information, one example is the 'DateOfOccurence' field 607 that is presented in the dataset 600. This field may provide the time and date of the occurrence of the recorded incident in the document. Field 607 has corresponding field entry 608 for document 601, and a corresponding field entry 609 for document 602. An example of a "categorical" type field is the 'RestrictedWork' field 610 with corresponding field entries 611 and 612, for documents 601 and 602 respectively. As can be seen with this field type which has a very small number of unique textual values, the entered values are 'n' in the field entries 611, and 612.

One example of the "small-vocab" field which is a textual column that is smaller than the "free-text" field type but has a vocabulary too large for the "categorical" field type is the 'ReleaseSource' field 613 with accompanying field values 614 and 615 for documents 601, and 602 respectively. As can be seen each field value entry 614, 615 has a handful number of words. An example of the "Quantity-based" field type that typically contains numeric and textual information describing or capturing area, volume, or time information, generally with the textual entry in this field being limited to describing a unit of measurement, is the 'OnSiteAreaAffected' field 616 with corresponding field entries 617, 618 for documents 601 and 602 respectively. As can be seen this field type contains a numerical portion to indicate the quantity value and a textual portion to indicate the unit of measurement. Dataset 600 is merely one example of a possible dataset that could be used in the systems and methods disclosed herein. In several embodiments each document may instead comprise a row, while field entries comprise the columns. Other forms of data other than the presented tabular format may also be used.

FIG. 7 is a block diagram of a computer apparatus 3000 with data processing subsystems or components, which a set of instructions to perform any one or more of the methodologies discussed herein may be executed, according to at least one aspect of the present disclosure. The subsystems shown in FIG. 6 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 8 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 3002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other, or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

FIG. 9A-9C illustrates multiple screens of one aspect of a user interface that may be utilized or displayed by any of the systems and methods described herein. The user interface 900 ("UI") illustrates three example screens, screen 901, screen 902, and screen 903. Screens 901-903 may contain some or all the data entries, field entries, and values that have been discussed in this document which may, for example, match the various entries in FIG. 6. UI screen 901 may include entries and entry fields for a title, a description of the incident, immediate action taken, the date and time of an occurrence, information about the individual injured and their relationship with the entity or company, information about the shift of a person involved, and time on-site, information on the incident type as well as location information. UI screen 902 may also include other entry fields and entries including details on an event such as information on the task leading to the event, any objects involved, immediate causes of the incident, OSHA and other external reporting requirements, information on the treatment provided, as well as details on the illness or injury.

UI Screen 903 may also contain other data entries and fields such as equipment failure information, insurance information and reporting, and release of materials or noxious elements. These data entries and entry fields are not exhaustive and may be arranged in any manner in UI 900. UI 900 may also contain side panels and other graphical elements that allow navigation between different tabs or information screens, for example an investigation screen that contains all the data entries, an action items screen, an attachments screen that may include attached files, and other miscellaneous buttons and panes. The UI 900 may be utilized for one incident or may allow data entry, and data display of more than one incident or incident report simultaneously, and a user may add new entry fields and types, attach files, add actions, and save the information input into the UI 900.

Finally, UI 900 may present recommendations, or a result of the automatic systems and methods described herein, for example to classify the information or data of an incident that is input by a user into UI 900 as a lessons-learned record. Therefore UI 900 may support and implement various types of interactive functions based on processed inputs and results produced by the methods and systems described herein, as well as determinations that the system has made and then provided to the user.

Examples of the method according to various aspects of the present disclosure are provided below in the following numbered clauses. An aspect of the method may include any one or more than one, and any combination of, the numbered clauses described below.

Clause 1. A computer implemented method of training a machine learning network to classify a document, the method comprising inputting, a data entry, of a first field type, of a document into a deep neural network (DNN); encoding, via the DNN, the data entry to output a densely embedded contextual vector representing contents of the data entry; encoding, via a machine learning network, ordered values representing another data entry, of a second field type, into a sparse vector representation of the another data entry; concatenating, the densely embedded contextual vector with the sparse vector representation to generate a representative vector of the document; and inputting, the representative vector, as training inputs, into a gradient-boosted classifier network to generate a classification of the document.

Clause 2. The method of Clause 1, further comprising applying, preprocessing techniques to a plurality of data documents, wherein the plurality of data documents may be labeled or unlabeled, wherein the preprocessing techniques may identify associated labels to at least a portion of the plurality of data documents.

Clause 3. The method of any one of Clauses 1-2, further comprising generating, a plurality of preprocessed documents, from the plurality of data documents, wherein each document of the plurality of preprocessed documents comprises one or more data entries, each entry of at least one type.

Clause 4. The method of any one of Clauses 1-3, further comprising generating, a list of ordered values from the another data entry.

Clause 5. The method of any one of Clauses 1-4, further comprising inputting, a label associated with the document, as a training input, into the gradient-boosted classifier network.

Clause 6. The method of any one of Clauses 1-5, wherein the first field type or the second field type may comprise an entry type of any of a free-text type, a categorical type, a small-vocab type, a quantity-based type, and a date-time type.

Clause 7. The method of any one of Clauses 1-6, wherein the another data entry comprises a plurality of distinct field entries, each entry of the plurality of distinct field entries comprising a field type.

Clause 8. The method of any one of Clauses 1-7, further comprising tuning, a hyperparameter of the gradient-boosted classifier network via automatic Bayesian optimization based on the representative vector.

Clause 9. The method of any one of Clauses 1-8 wherein the hyperparameter that is optimized via the automatic Bayesian optimization, attaches larger weight to recall than precision.

Clause 10. The method of any one of Clauses 1-9, wherein further comprising providing the associated labels as inputs in at least one of a tuning of hyperparameters of the gradient-boosted classifier network, and the training of the gradient-boosted classifier network.

Clause 11. The method of any one of Clauses 1-10, wherein the encoding via the machine learning network, utilizes a one-hot embedding technique.

Clause 12. The method of any one of Clauses 1-11, further comprising: replacing a term in the another data entry with a placeholder if it does not meet a predetermined frequency.

Clause 13. The method of any one of Clauses 1-12, wherein the DNN is one of a transformer neural network, or a distributed word representation model.

Clause 14. The method of any one of Clauses 1-13, wherein the densely embedded contextual vector is based on a CLS token from the DNN.

Clause 15. The method of any one of Clauses 1-14, wherein the densely embedded contextual vector is based on a positional embedding associated with the word order of the data entry.

Clause 16. A system to automatically classify and transfer files, the system comprising at least one of a database or server containing a plurality of data documents, wherein the plurality of data documents are stored in at least one location via a file system; a processor; and a computer readable medium storing instructions executable by the processor, to input a representative vector of the document into a trained classifier network; determine a classification of the document by the trained classifier network based at least on the representative vector; based on the classification determine an appropriate file location of the document; and transfer the document to the appropriate file location.

Clause 17. The system of Clause 16, wherein the instructions executable by the processor further comprise input a label associated with the document into the trained classifier network.

Clause 18. The system of Clause 16-17, wherein the instructions to determine the classification of the document may also determine the classification based on the label.

Clause 19. The system of any one of Clauses 16-18, wherein the trained classifier network is trained by instructions executable by the processor comprising input, a first type data entry of a document from the plurality of data documents into a deep neural network (DNN); encode, via the DNN, the first type data entry to output a densely embedded contextual vector representing contents of the first type data entry; encode, via a machine learning network, ordered values representing another data entry, into a sparse vector representation of the another data entry; concatenate, the densely embedded contextual vector with the sparse vector representation to generate a representative vector of the document; and input the representative vector and a label associated with the document into a gradient-boosted classifier network to generate a classification of the document.

Clause 20. The system of any one of Clauses 16-19, wherein the instructions executable by the processor further comprise applying, preprocessing techniques to the plurality of data documents, wherein the plurality of data documents may be labeled or unlabeled, wherein the preprocessing techniques may identify associated labels to at least a portion of the plurality of data documents.

Clause 21. The system of any one of Clauses 16-20, wherein the instructions executable by the processor further comprise generating, a plurality of preprocessed documents, from the plurality of data documents, wherein each document of the plurality of preprocessed documents comprises one or more data entries of at least one type, wherein the document may be associated to the label.

Clause 22. A non-transitory computer-readable storage medium having embodied thereon a program, the program being executable by a processor to perform a method for providing a sentiment for digital information comprising inputting, one or more data entries, of one or more field types, from a document into a deep neural network (DNN); encoding, via the DNN, the one or more data entries to output a densely embedded contextual vector representing contents of the one or more data entries; encoding, via a machine learning network, ordered values representing another one or more data entries, of one or more other field types, into a sparse vector representation of the another data entry; concatenating, the densely embedded contextual vector with the sparse vector representation to generate a representative vector of the document; and inputting the representative vector and a label associated with the document, as training inputs, into a classifier network to generate a classification of the document.

Clause 23. The non-transitory computer-readable storage medium of Clause 22, wherein the method performed by the program further comprises applying, preprocessing techniques to a plurality of data documents, wherein the plurality of data documents may be labeled or unlabeled, wherein the preprocessing techniques may identify associated labels to at least a portion of the plurality of data documents; and generating, a plurality of preprocessed documents, from the plurality of data documents, wherein each document of the plurality of preprocessed documents comprises one or more data entries of at least one type, wherein the document may be associated to the label.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer implemented method of training a machine learning network to classify a data record, the method comprising:
   receiving a plurality of data records relating to workplace incidents, each of the plurality of data records having a plurality of field entries;
   processing the plurality of field entries by performing a first data filtering based on a temporal distribution of the workplace incidents followed by a second data filtering based at least on missing value ratios to identify at least a first predefined textual field type and a second data field type;
   inputting at least a first portion of the plurality of field entries of the first predefined textual field type into a deep neural network (DNN);
   inputting at least a second portion of the plurality of field entries of the second data field type into a different machine learning model (ML);
   encoding, via the DNN, the first portion of the plurality of field entries of the first predefined textual field type to output a densely embedded contextual vector;
   encoding, via the ML, ordered values representing the second portion of the plurality of field entries of the second data field type into a sparse vector;
   concatenating the densely embedded contextual vector with the sparse vector to generate a representative vector of the plurality of data records;
   inputting the representative vector as training inputs into a gradient-boosted classifier network to generate a classification of each data record; and
   tuning a hyperparameter of the gradient-boosted classifier network by using the representative vector as a tuning input.

2. The method of claim 1, wherein the data records are labeled or unlabeled.

3. The method of claim 2, further comprising:
   generating preprocessed records from the data records, wherein each record of the preprocessed records comprises one or more data entries, each entry of at least one type.

4. The method of claim 3, further comprising:
   inputting a label associated with each preprocessed record as a training input into the gradient-boosted classifier network.

5. The method of claim 1, wherein the first predefined textual field type or the second data field type comprises an entry type of any of a free-text type, a categorical type, a small-vocab type, a quantity-based type, and a date-time type.

6. The method of claim 1, wherein the tuning the hyperparameter of the gradient-boosted classifier network uses automatic Bayesian optimization based on the representative vector.

7. The method of claim 6, wherein the hyperparameter that is optimized via the automatic Bayesian optimization attaches a larger weight to recall than precision.

8. The method of claim 4, further comprising:
   providing the label as inputs for tuning the hyperparameter of the gradient-boosted classifier network.

9. The method of claim 1, wherein the encoding via the ML utilizes a one-hot embedding technique.

10. The method of claim 1, further comprising:
    replacing a term in one of the plurality of field entries with a placeholder if it does not meet a predetermined frequency.

11. The method of claim 1, wherein the DNN is one of a transformer neural network or a distributed word representation model.

12. The method of claim 1, wherein the densely embedded contextual vector is based on a CLS token from the DNN.

13. The method of claim 1, wherein the first predefined textual field type includes a free-text field type that is input into the DNN.

14. The method of claim 13, wherein the second data field type is of any field type other than the free-text field type and is input into the ML.

15. The method of claim 1, wherein the encoding, via the DNN, the first portion of the plurality of field entries of the first predefined textual field type to output the densely embedded contextual vector comprises:
    applying an embedding layer to embed values in the first portion of the plurality of field entries of the first predefined textual field type in accordance with a selected ratio to each of a plurality of numerical vectors; and
    applying one or more encoder layers to transform the plurality of numerical vectors into a sequence of vectors as a function of the first portion of the plurality of field entries of the first predefined textual field type.

16. A system to automatically classify and transfer files, the system comprising:
    at least one of a database or server containing data records relating to workplace incidents, each of the data records having a plurality of field entries, wherein the data records are stored in at least one location via a file system;
    a processor; and
    a computer readable medium storing instructions executable by the processor to:
      process the plurality of field entries by performing a first data filtering based on a temporal distribution of the workplace incidents followed by a second data filtering based at least on missing value ratios to identify at least a first predefined textual field type and a second data field type;
      input at least a first portion of the plurality of field entries of the first predefined textual field type into a deep neural network (DNN);
      input at least a second portion of the plurality of field entries of the second data field type into a different machine learning model (ML);
      encode, via the DNN, the first portion of the plurality of field entries of the first predefined textual field type to output a densely embedded contextual vector;
      encode, via the ML, ordered values representing the second portion of the plurality of field entries of the second data field type into a sparse vector;
      concatenate the densely embedded contextual vector with the sparse vector to generate a representative vector of the plurality of data records;

input the representative vector into a trained classifier network;

determine a classification of each data record by the trained classifier network based at least on the representative vector;

based on the classification determined by the trained classifier network, determine an appropriate file location of each data record; and transfer each data record to the appropriate file location.

17. The system of claim 16, wherein the instructions executable by the processor further comprise instructions causing the processor to:

generate preprocessed records from the data records, wherein each preprocessed record comprises one or more data entries, each entry of at least one type; and input a label associated with each preprocessed record into the trained classifier network.

18. The system of claim 17, wherein the instructions to determine the classification of each data record determine the classification based on the label.

19. The system of claim 16, wherein the instructions executable by the processor further comprise instructions causing the processor to:

tune a hyperparameter of the trained classifier network by using the representative vector as a tuning input.

20. The system of claim 16, wherein the data records are labeled or unlabeled.

21. A non-transitory computer-readable storage medium having embodied thereon a program, the program being executable by a processor to:

receive a plurality of data records relating to workplace incidents, each of the plurality of data records having a plurality of field entries;

process the plurality of field entries by performing a first data filtering based on a temporal distribution of the workplace incidents followed by a second data filtering based at least on missing value ratios to identify at least a first predefined textual field type and a second data field type;

input at least a first portion of the plurality of field entries of the first predefined textual field type into a deep neural network (DNN);

input at least a second portion of the plurality of field entries of the second data field type into a different machine learning model (ML);

encode, via the DNN, the first portion of the plurality of field entries of the first predefined textual field type to output a densely embedded contextual vector;

encode, via the ML, ordered values representing the second portion of the plurality of field entries of the second data field type into a sparse vector;

concatenate the densely embedded contextual vector with the sparse vector to generate a representative vector;

input the representative vector and a label associated with each data record as training inputs into a gradient-boosted classifier network to generate a classification of each data record; and tune a hyperparameter of the gradient-boosted classifier network by using the representative vector as a tuning input.

22. The non-transitory computer-readable storage medium of claim 21, wherein the data records are labeled or unlabeled.

* * * * *